(12) United States Patent
Mathew et al.

(10) Patent No.: US 8,139,305 B2
(45) Date of Patent: Mar. 20, 2012

(54) SYSTEMS AND METHODS FOR TIMING AND GAIN ACQUISITION

(75) Inventors: George Mathew, San Jose, CA (US); Hongwei Song, Longmont, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 135 days.

(21) Appl. No.: 12/558,928

(22) Filed: Sep. 14, 2009

(65) Prior Publication Data
US 2011/0063747 A1    Mar. 17, 2011

(51) Int. Cl.
*G11B 5/35* (2006.01)

(52) U.S. Cl. ............... 360/65; 360/31; 360/39; 360/43; 360/67; 360/68

(58) Field of Classification Search .......... None
See application file for complete search history.

(56) References Cited

U.S. PATENT DOCUMENTS

| | | | |
|---|---|---|---|
| 5,262,904 A | 11/1993 | Tang et al. | |
| 5,287,228 A * | 2/1994 | Sawaguchi et al. | 360/57 |
| 5,357,520 A | 10/1994 | Arnett et al. | |
| 5,416,809 A * | 5/1995 | Masuda et al. | 375/376 |
| 5,493,454 A | 2/1996 | Ziperovich et al. | |
| 5,517,146 A | 5/1996 | Yamasaki | |
| 5,583,705 A * | 12/1996 | Ziperovich et al. | 360/45 |
| 5,757,576 A * | 5/1998 | Kosugi | 360/78.14 |
| 5,781,358 A | 7/1998 | Hasegawa | |
| 5,986,830 A | 11/1999 | Hein | |
| 5,999,355 A | 12/1999 | Behrens et al. | |
| 6,043,942 A | 3/2000 | Cunningham et al. | |
| 6,091,560 A | 7/2000 | Du | |
| 6,130,794 A | 10/2000 | Christensen | |
| 6,134,691 A | 10/2000 | Hirasaka | |
| 6,141,168 A | 10/2000 | Takahashi et al. | |
| 6,147,828 A | 11/2000 | Bloodworth et al. | |
| 6,181,505 B1 | 1/2001 | Sacks et al. | |
| 6,208,481 B1 | 3/2001 | Spurbeck et al. | |

(Continued)

FOREIGN PATENT DOCUMENTS

GB    2 320 8669723484.3    6/1997

OTHER PUBLICATIONS

U.S. Appl. No. 12/199,325, filed Aug. 27, 2008, Mathew.

(Continued)

*Primary Examiner* — Dismery Mercedes
(74) *Attorney, Agent, or Firm* — Hamilton DeSanctis and Cha (57) ABSTRACT

Various embodiments of the present invention provide systems and methods for acquiring timing and/or gain information. For example, various embodiments of the present invention provide data processing circuits that include a sample splitting circuit, a first averaging circuit, a second averaging circuit and a parameter calculation circuit. The sample splitting circuit receives a data input that includes a series of samples that repeat periodically over at least a first phase and a second phase. The sample splitting circuit divides the series of samples into at least a first sub-stream corresponding to the first phase and a second sub-stream corresponding to the second phase. The first averaging circuit averages values from the first sub-stream to yield a first average, and the second averaging circuit averages values from the second sub-stream to yield a second average. The parameter calculation circuit calculates a parameter value based at least in part on the first average and the second average.

20 Claims, 4 Drawing Sheets

U.S. PATENT DOCUMENTS

| | | | |
|---|---|---|---|
| 6,212,024 B1 | 4/2001 | Igarashi et al. | |
| 6,243,031 B1 | 6/2001 | Jusuf et al. | |
| 6,246,723 B1 | 6/2001 | Bliss et al. | |
| 6,278,565 B1 * | 8/2001 | Yoon | 360/46 |
| 6,337,778 B1 | 1/2002 | Gagne | |
| 6,396,651 B1 | 5/2002 | Grover | |
| 6,404,572 B1 | 6/2002 | Hong | |
| 6,535,345 B1 | 3/2003 | Shimoda | |
| 6,563,655 B1 | 5/2003 | Yamasaki et al. | |
| 6,621,648 B2 | 9/2003 | Elliott et al. | |
| 6,662,303 B1 | 12/2003 | Toosky et al. | |
| 6,671,244 B2 | 12/2003 | Honma | |
| 6,674,590 B2 | 1/2004 | Ottesen et al. | |
| 6,678,230 B2 | 1/2004 | Miyashita et al. | |
| 6,721,114 B1 | 4/2004 | Sutardja et al. | |
| 6,788,481 B2 | 9/2004 | Fang et al. | |
| 6,788,484 B2 * | 9/2004 | Honma | 360/51 |
| 6,894,854 B1 | 5/2005 | Carlson et al. | |
| 6,912,682 B1 | 6/2005 | Aoki | |
| 6,934,100 B2 | 8/2005 | Ueno | |
| 6,937,415 B2 | 8/2005 | Galbraith et al. | |
| 7,012,772 B1 | 3/2006 | Vis | |
| 7,079,342 B1 | 7/2006 | Han et al. | |
| 7,092,179 B2 | 8/2006 | Yamanouchi | |
| 7,092,180 B2 | 8/2006 | Franck | |
| 7,123,429 B2 | 10/2006 | Musungu et al. | |
| 7,126,773 B1 | 10/2006 | Taratorin | |
| 7,139,143 B2 | 11/2006 | Tsunoda et al. | |
| 7,193,802 B2 | 3/2007 | Cideciyan et al. | |
| 7,248,424 B2 | 7/2007 | Ueno | |
| 7,256,954 B2 | 8/2007 | Serizawa et al. | |
| 7,262,928 B1 | 8/2007 | Oberg | |
| 7,271,753 B1 | 9/2007 | Padukone et al. | |
| 7,308,057 B1 | 12/2007 | Patapoutian | |
| 7,426,236 B1 | 9/2008 | He | |
| 7,440,224 B2 | 10/2008 | Ehrlich et al. | |
| 7,495,854 B2 | 2/2009 | Hutchins | |
| 7,522,360 B2 * | 4/2009 | Imamura et al. | 360/31 |
| 7,542,227 B2 | 6/2009 | Che et al. | |
| 7,696,838 B2 | 4/2010 | Wada | |
| 7,715,135 B1 | 5/2010 | Sutardja et al. | |
| 7,733,591 B2 | 6/2010 | Bottemiller et al. | |
| 2002/0159350 A1 | 10/2002 | Ogura et al. | |
| 2003/0026354 A1 | 2/2003 | Chang et al. | |
| 2003/0048564 A1 | 3/2003 | Koller et al. | |
| 2003/0081345 A1 * | 5/2003 | Hamada et al. | 360/77.08 |
| 2004/0220781 A1 * | 11/2004 | Hiratsuka et al. | 702/189 |
| 2005/0068650 A1 * | 3/2005 | Annampedu et al. | 360/39 |
| 2005/0117243 A1 | 6/2005 | Serizawa | |
| 2006/0061496 A1 | 3/2006 | Stein et al. | |
| 2006/0062125 A1 | 3/2006 | Horie et al. | |
| 2006/0176947 A1 | 8/2006 | Lim | |
| 2006/0181797 A1 * | 8/2006 | Sugawara et al. | 360/51 |
| 2006/0232871 A1 | 10/2006 | Brittenham | |
| 2007/0008643 A1 * | 1/2007 | Brady et al. | 360/75 |
| 2007/0041115 A1 | 2/2007 | Lee | |
| 2007/0047120 A1 | 3/2007 | DeGroat | |
| 2007/0076313 A1 | 4/2007 | Hutchins et al. | |
| 2007/0140088 A1 | 6/2007 | Hino et al. | |
| 2007/0236270 A1 | 10/2007 | Chiang et al. | |
| 2007/0260623 A1 | 11/2007 | Jaquette et al. | |
| 2008/0019469 A1 * | 1/2008 | Shiraishi | 375/354 |
| 2008/0031114 A1 | 2/2008 | Hong et al. | |
| 2008/0032652 A1 | 2/2008 | Zhao et al. | |
| 2008/0037153 A1 | 2/2008 | Yoshizawa | |
| 2009/0161245 A1 | 6/2009 | Mathew et al. | |

OTHER PUBLICATIONS

U.S. Appl. No. 12/273,265, filed Nov. 18, 2008, Mathew.
U.S. Appl. No. 12/337,775, filed Dec. 18, 2008, Mathew.
U.S. Appl. No. 12/337,805, filed Dec. 18, 2008, Mueller.
U.S. Appl. No. 12/337,828, filed Dec. 18, 2008, Mueller.
U.S. Appl. No. 12/337,850, filed Dec. 18, 2008, Mueller.
U.S. Appl. No. 12/348,236, filed Jan. 2, 2009, Liu.
U.S. Appl. No. 12/371,906, filed Feb. 16, 2009, Ratnakar Aravind.
U.S. Appl. No. 12/430,948, filed Apr. 28, 2009, Grundvig.
U.S. Appl. No. 12/247,378, filed Apr. 8, 2010, Mathew.
U.S. Appl. No. 12/463,626, filed May 11, 2009, Mathew.
U.S. Appl. No. 12/510,222, filed Jul. 27, 2009, Ratnakar Aravind.
U.S. Appl. No. 12/663,325, filed Apr. 20, 2010, Mathew.
U.S. Appl. No. 12/652,201, filed Jan. 5, 2010, Mathew.
Cho & Lee, "An Estimation Technique for Nonlinear Distortion In High Density Magnetic Recording Channels", IEEE Transactions on Magnetics, vol. 34, No. 1, pp. 40-44 Jan. 1998.
Degroat et al., "Experimental Characterization of Media Noise Based on Equalized Synchronized Drive Data", IEEE Trans. Magnetics, vol. 37, No. 2, pp. 633-638, Mar. 2001.
Farhang-Boroujeny, Adaptive Filters: Theory and Applications. John Wiley & Sons Ltd, 1998, Chapter 11. pp. 373-379.
Kavcic and Patapoutian, "A Signal-Dependent Autoregressive Channel Model", IEEE Trans. Magnetics, vol. 35 No. 5, pp. 2316-2318, Sep. 1999.
Lin et al. "An estimation technique for accurately modelling the magnetic recording channel including nonlinearities." IEEE Trans. Mag, vol. 25, No. 5, pp. 4084-4086, Sep. 1989.
Moon, J., "Signal-to-Noise Ratio Definition for Magnetic Recording Channels With Transition Noise", IEEE Trans. Magnetics, vol. 36, No. 5, pp. 3881-3883, Sep. 2000.
Palmer et al, "Identification of nonlinear write effects using pseudorandom sequences" IEEE Trans. Magnetics, vol. 23 No. 5, pp. 2377-2379, Sep. 1987.
Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.
Tokumasu et al. "A New Reduced Clock-Swing Flip-Flop (NDKFF)," Corporate Research & Development Center, Toshiba Corporation. IEEE Feb. 2002 Custom Intergrated Circuits Conf.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

SYSTEMS AND METHODS FOR TIMING AND GAIN ACQUISITION

BACKGROUND OF THE INVENTION

The present inventions are related to systems and methods for data processing, and more particularly to systems and methods for acquiring timing and gain information.

Figure 1:
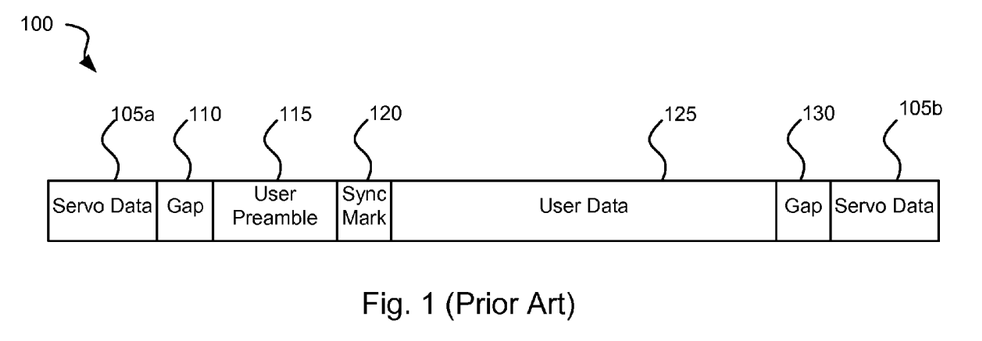
FIG. 1 depicts an existing series of data that may be transferred in a storage device.

In typical storage devices, information is stored to a magnetic storage medium that includes embedded data fields that may be used to synchronize to information derived from the storage medium. FIG. 1 shows an exemplary series of data 100 that may be transferred in a storage device. As shown, data 100 includes servo data 105 followed by a gap 110, a user preamble 115, a sync mark 120, and subsequent user data 125. User data 125 is followed by a gap 130. The data pattern is then repeated with the next servo data 105 pattern. The derivation of timing and gain information is based upon estimating phase and frequency of the received data from a preamble period. Accurate estimation of phase and frequency may be achieved where longer preamble patterns are utilized. To this end, some data storage systems rely on extended length preamble patterns. Such patterns, however, increase the overhead associated with the data and result in a corresponding decrease in data storage efficiency.

Hence, for at least the aforementioned reasons, there exists a need in the art for advanced systems and methods for acquiring timing and/or gain.

BRIEF SUMMARY OF THE INVENTION

The present inventions are related to systems and methods for data processing, and more particularly to systems and methods for acquiring timing and gain information.

Various embodiments of the present invention provide data processing circuits. Such data processing circuits include a sample splitting circuit, a first averaging circuit, a second averaging circuit and a parameter calculation circuit. The sample splitting circuit receives a data input that includes a series of samples that repeat periodically over at least a first phase and a second phase. The sample splitting circuit divides the series of samples into at least a first sub-stream corresponding to the first phase and a second sub-stream corresponding to the second phase. The first averaging circuit averages values from the first sub-stream to yield a first average, and the second averaging circuit averages values from the second sub-stream to yield a second average. The parameter calculation circuit calculates a parameter value based at least in part on the first average and the second average. The parameter value may be one or more of a gain value, a frequency value, and/or a phase value.

In some cases where the parameter value includes the frequency value, the systems may further include a differencing circuit that calculates a first differencing sequence based at least in part the first sub-stream and a second differencing sequence based at least in part on the second sub-stream. In such cases, the parameter calculation circuit includes a frequency computation circuit that calculates the frequency value based at least in part on the first differencing sequence and the second differencing sequence.

In various instances of the aforementioned embodiments, the series of samples repeats periodically over at least a first phase, a second phase, a third phase and a fourth phase. In such embodiments, the sample splitting circuit divides the series of samples into at least a first sub-stream corresponding to the first phase, a second sub-stream corresponding to the second phase, a third sub-stream corresponding to the third phase, and a fourth sub-stream corresponding to the fourth phase. The systems further include a third averaging circuit that averages values from the third sub-stream to yield a third average, and a fourth averaging circuit that averages values from the fourth sub-stream to yield a fourth average. The parameter calculation circuit calculates the parameter value based at least in part on the first average, the second average, the third average and the fourth average.

In particular instances of the aforementioned embodiments, the parameter value includes the frequency value. In such instances, the systems may further include a differencing circuit that calculates a first differencing sequence based at least in part on the first sub-stream, a second differencing sequence based at least in part on the second sub-stream, a third differencing sequence based at least in part on the third sub-stream, and a fourth differencing sequence based at least in part on the fourth sub-stream. The parameter calculation circuit includes a frequency computation circuit that calculates the frequency value based at least in part on the first differencing sequence, the second differencing sequence, the third differencing sequence, and the fourth differencing sequence.

In one or more instances of the aforementioned embodiments, the systems may further include a servo data processing circuit that processes a servo data field in the data input. In various instances of the aforementioned embodiments, the systems further include a user data processing circuit that processes a user data filed in the data input using one or more of the gain value, the frequency value, and/or the phase value.

Other embodiments of the present invention provide methods for estimating data processing parameters. Such methods include receiving a data input at a sample splitting circuit. The data input includes a series of samples that repeat periodically over at least a first phase and a second phase, and the sample splitting circuit divides the series of samples into at least a first sub-stream corresponding to the first phase and a second sub-stream corresponding to the second phase. The methods further include providing the first sub-stream to a first averaging circuit, and averaging the values from the first sub-stream to yield a first average; and providing the second sub-stream to a second averaging circuit, and averaging the values from the second sub-stream to yield a second average. A parameter value based at least in part on the first average and the second average is calculated. The parameter value may be one or more of a gain value, a frequency value, and/or a phase value.

In some instances of the aforementioned embodiments, the methods further include: calculating a first differencing sequence based at least in part on the first sub-stream; and calculating a second differencing sequence based at least in part on the second sub-stream. In such instances, calculating the frequency value is based at least in part on the first differencing sequence and the second differencing sequence.

In various instances of the aforementioned embodiments, the series of samples repeats periodically over at least a first phase, a second phase, a third phase and a fourth phase. In such instances, the sample splitting circuit divides the series of samples into at least a first sub-stream corresponding to the first phase, a second sub-stream corresponding to the second phase, a third sub-stream corresponding to the third phase, and a fourth sub-stream corresponding to the fourth phase. The methods further include: providing the third sub-stream to a third averaging circuit, and averaging the values from the third sub-stream to yield a third average; and providing the fourth sub-stream to a fourth averaging circuit, and averaging the values from the fourth sub-stream to yield a fourth average. Calculating the parameter value is based at least in part on the first average, the second average, the third average and the fourth average.

Yet other embodiments of the present invention provide storage devices that include: a storage medium, a read/write head assembly, and a read channel circuit. The storage medium includes information that comprises a periodically repeating pattern that repeats over at least a first phase, a second phase, a third phase and a fourth phase. The read/write head assembly is disposed in relation to the storage medium. The read channel circuit receives the information via the read/write head assembly and converts the information to a series of digital samples. The read channel circuit includes: a sample splitting circuit, a first averaging circuit, a second averaging circuit, a third averaging circuit, a fourth averaging circuit, and a parameter calculation circuit. The sample splitting circuit receives the series of digital samples and divides the series of digital samples into at least a first sub-stream corresponding to the first phase, a second sub-stream corresponding to the second phase, a third sub-stream corresponding to the third phase, and a fourth sub-stream corresponding to the fourth phase. The first averaging circuit averages values from the first sub-stream to yield a first average, the second averaging circuit averages values from the second sub-stream to yield a second average, the third averaging circuit averages values from the third sub-stream to yield a third average, and the fourth averaging circuit averages values from the fourth sub-stream to yield a fourth average. The parameter calculation circuit calculates a parameter value based at least in part on the first average, the second average, the third average and the fourth average. The parameter value may be one or more of a gain value, a frequency value, and/or a phase value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for acquiring timing and gain information.

Figure 2:
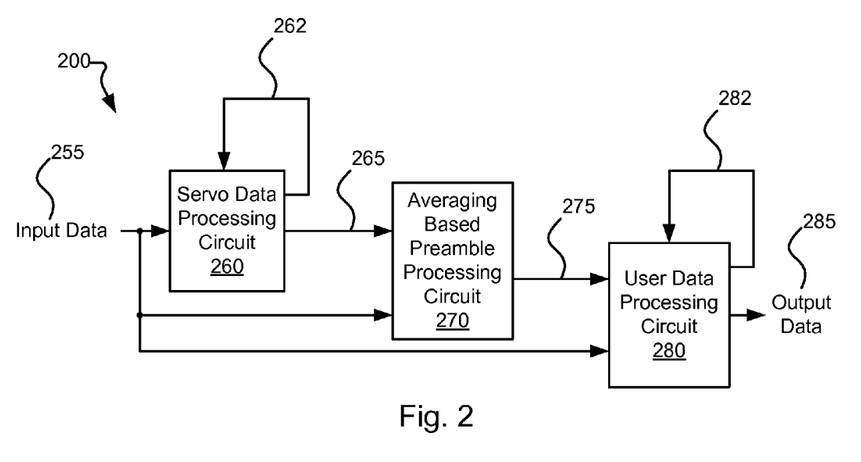
FIG. 2 shows a data processing circuit capable of performing timing and gain acquisition from a series of data transferred in a storage device in accordance with one or more embodiments of the present invention.

Turning to FIG. 2, a data processing circuit 200 capable of performing timing and gain acquisition from a series of data transferred in a storage device is shown. Data processing circuit 200 includes a servo data processing circuit 260, an averaging based preamble processing circuit 270, and a user data processing circuit 280. Servo data processing circuit 260 receives input data 255. Input data 255 may be any data pattern that includes a user preamble or other synchronization information that includes timing and/or gain information used in processing user data. In some embodiments of the present invention, input data 255 may be similar to that discussed in relation to FIG. 1 above. Input data 255 includes servo data as is known in the art that is used to identify a location on a particular storage medium that is being accessed. Servo data processing circuit 260 may be any circuit capable of processing servo data to identify a location on a storage medium. A feedback loop 262 forms part of a phase lock loop circuit within servo data processing circuit 260 that is used to synchronize to the servo data field in input data 255.

Once servo data processing circuit 260 synchronizes to the servo data and identifies a location on the storage medium, a user data start flag 265 is asserted indicating the start of the user data field of input data 255. Similar to that discussed above in relation to FIG. 1, the user data field may include, but is not limited to, a gap followed by a user preamble and a sync mark. Upon assertion of user data start flag 265, averaging based preamble processing circuit 270 processes input data 255 where the user preamble is used to determine timing and gain. Of note, such timing and gain information is determined without the use of a continuous adjustment of a phase/frequency offset using a phase lock loop circuit. Rather, averaging based preamble processing circuit 270 relies on the small frequency offset exhibited across the length of the preamble. This permits linearization of the preamble data in frequency offset using first-order Taylor series approximation. In addition, the estimation of phase offset, frequency offset and amplitude are done using difference signals obtained by taking difference of samples of input data 255 separated by a few bits. By virtue of this differencing approach, the linearization error is kept small. Different types of difference signal computation may be applied for estimating phase, frequency and amplitude, where the type of difference signal computation is selected to enhance the strength of the signal component containing the quantity to be estimated.

In one exemplary embodiment of the present invention, the preamble contains a four phase periodic pattern, $\{+1, +1, -1, -1\}$, repeated a number of times. In some embodiments of the present invention, between twenty and forty repetitions of the above mentioned four phase periodic pattern are included in the user preamble. In other embodiments of the present invention, between ten and sixty repetitions of the above mentioned four phase periodic pattern are included in the user preamble. Each of the four phases of the user preamble are separated into distinct sub-streams, with each of the four phases corresponding to a particular phase of a signal period. Taking differences between the first and third sub-streams and/or the second and fourth sub-streams enhance the signal component containing phase offset and amplitude, while taking self-difference of each sub-stream enhances the signal components containing the frequency offset. These features of the differencing mechanism used here lead to reliable estimation of phase offset, frequency offset and signal amplitude. Such an approach provides a relatively simple means for reliably estimating phase offset, frequency offset, and signal amplitude (i.e., gain). In some cases, a phase lock loop is not needed, and reliable estimates can be achieved without requiring a feedback loop.

The determined timing and gain information is provided as a composite output 275 from averaging based preamble processing circuit 270 to user data processing circuit 280. User data processing circuit 280 may be any user data processing circuit known in the art that is capable of processing user data from input data 255 based upon frequency and gain information. As shown, user data processing circuit 280 includes a feedback loop 282 that forms part of a phase lock loop circuit within user data processing circuit 280 that is used to track the user data field in input data 255. The recovered user data bits are provided as an output data set 285.

Figure 3:
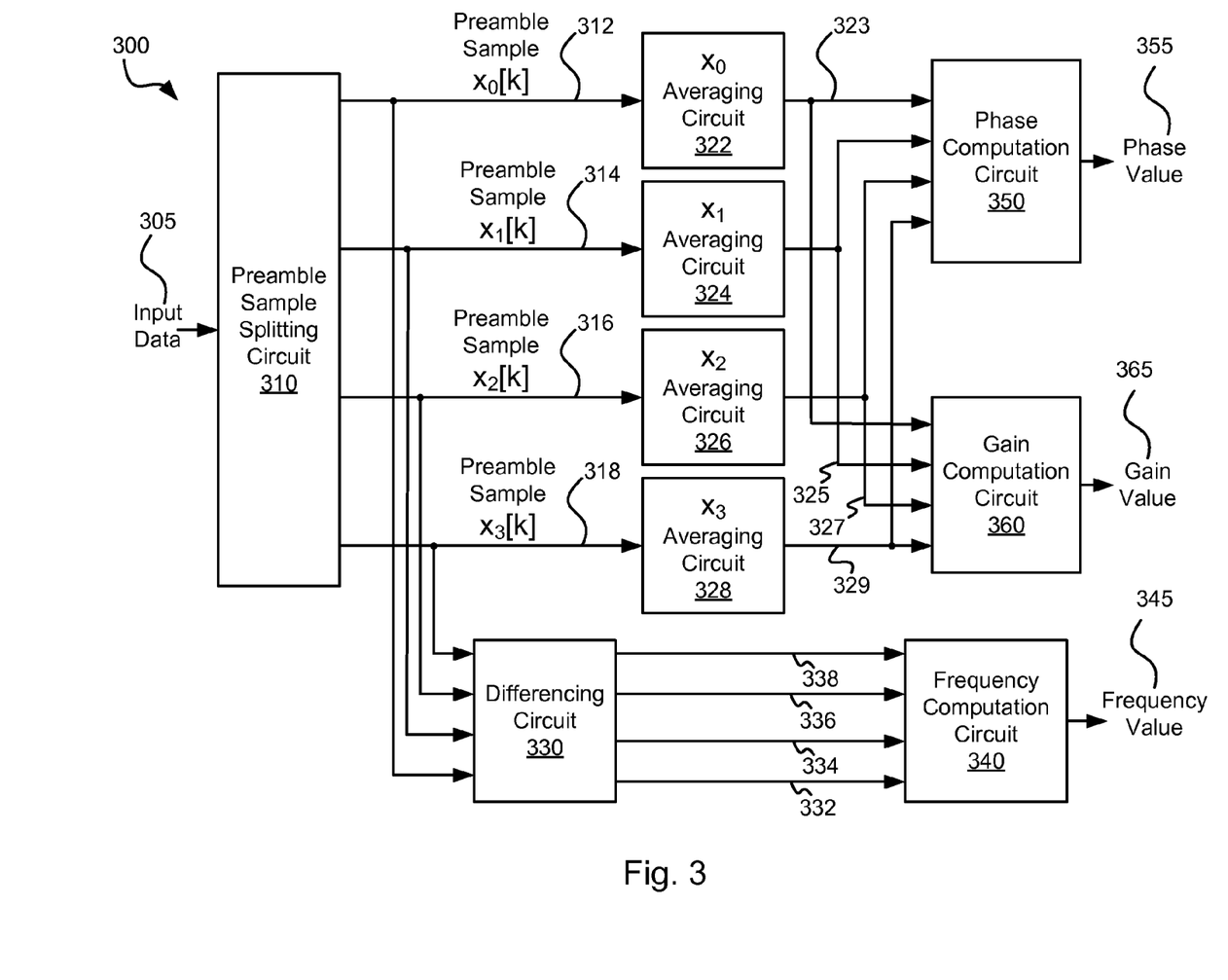
FIG. 3 depicts an averaging based preamble processing circuit in accordance with various embodiments of the present invention.

Turning to FIG. 3, a block diagram of an averaging based preamble processing circuit 300 is shown in accordance with various embodiments of the present invention. Averaging based preamble processing circuit 300 includes a preamble splitting circuit 310 that receives input data samples 305. Input data samples 305 may be any data pattern that includes a user preamble or other synchronization information. In some embodiments of the present invention, input data samples 305 may be similar to that discussed in relation to FIG. 1 above. In one particular embodiment of the present invention, the included user preamble may be a series of sample sets, with each of the sample sets corresponding to a different phase of the preamble. For example, in one exemplary embodiment of the present invention, the preamble is the following four phase preamble, $\{+1$ (first phase), $+1$ (second phase), $-1$ (third phase), $-1$ (fourth phase)$\}$. Preamble splitting circuit 310 separates each of the four phases of each preamble period into separate sub-streams 312, 314, 316, 318. The separate sub-streams are respectively labeled $x_0[k]$ (corresponding to the first bit), $x_1[k]$ (corresponding to the second bit), $x_2[k]$ (corresponding to the third bit), and $x_3[k]$ (corresponding to the fourth bit).

The signal at the input of the analog to digital converter (not shown) that provides input data samples 305 may be defined as:

$$x(t) = \sum_k a[k] h_b(t - kT) + v(t),$$

where $a[k] \in \{-1,+1\}$ denotes a non-return-to-zero (NRZ) data bit at instant k, T denotes the duration of one bit, $h_b(t)$ denotes the bit-response of the channel up to the input of the analog to digital converter, and v(t) denotes the total noise at the input of the analog to digital converter. The aforementioned equation ignores any non-linearities in the transmission, recording, and readback systems and processes that it represents.

If $\tau_0$ and $f_0$ are respectively the phase offset and frequency offset in the sampling clock with respect to the clock embedded in the readback signal, x(t), by sampling x(t) in the analog to digital converter using a sampling clock, the following baud-rate samples are achieved:

$$x[n] = x(t)|_{t=nT(1-\Delta_0)+\tau_0};$$

$$x[n] = \sum_k a[k] h_b(n(1 - \Delta_0) + \tau_0 - kT) + v(n(1 - \Delta_0) + \tau_0);$$

$$x[n] = \sum_k a[k] h_b[n, k, \Delta_0, \tau_0] + v[n];$$

where $$h_b[n,k,\Delta_0,\tau_0] = h_b(n(1-\Delta_0)T+\tau_0-kT) \text{ and } \Delta_0 = f_0 T.$$

Thus, $\Delta_0$ is the frequency offset normalized by the data rate. Accordingly, the sampled noise is expressed to be independent of phase and frequency offsets.

During the acquisition mode of synchronization, the data bits of input data samples 305 may consist of a periodic data stream. As an example, in a recording channel, the following periodic user preamble may be used $\{-1, -1, +1, +1\}$. The number of bits used for acquisition (e.g., the number of bits in the user preamble) is referred to as $N_a$. In some cases, $N_a$ is assumed to be a multiple of four as includes the aforementioned four phase periodicity. Because the aforementioned pattern does not contain even harmonics and since the recording channel is band limited, the readback signal will be sinusoidal with frequency given by 0.25/T. Accounting for the phase and frequency offsets in the sampling clock, the samples observed during the acquisition mode can be expressed as:

$$x[n] = A\cos\left(n\frac{\pi}{2}(1 - \Delta_0) + \phi_0\right) + v[n];$$

with $$\phi_0 = \frac{\pi}{2}\tau_0.$$

Here, A denotes the amplitude of the sinusoid, which is another parameter to be estimated.

The aforementioned noiseless equation can be re-written as:

$$x_S[n] = A\,\cos\left(n\frac{\pi}{2} + \phi_0 - n\frac{\pi}{2}\Delta_0\right).$$

If it is assumed that the frequency offset is small such that $0<|\Delta_0|\ll 1$, the aforementioned equation may be approximated as:

$$x_S[n] = A\,\cos\left(n\frac{\pi}{2} + \phi_0\right) + \frac{An\pi\Delta_0}{2}\sin\left(n\frac{\pi}{2} + \phi_0\right).$$

The aforementioned approximation assumes that the value of the time index, n, is not too large so that $$0 < \left|\frac{n\pi\Delta_0}{2}\right| \ll 1$$

holds. The time index, n, may be expressed as:

$$n=4k+l, \text{ with } l\in\{0,1,2,3\} \text{ and } k=0,1,2,3\ldots$$

Combining the aforementioned equations, $x_s[n]$ may be expressed as:

$$x_S[4k+l] \approx x_l[k] = A\,\cos\left(l\frac{\pi}{2} + \phi_0\right) + \frac{A(4k+l)\pi\Delta_0}{2}\sin\left(l\frac{\pi}{2} + \phi_0\right).$$

The values of l correspond to the phase samples of the user preamble from input data samples 305. Thus, where the user preamble includes four phases, the values of l are 0, 1, 2 and 3. Replacing the values of 1 into the above mentioned equation yields value for each of the four phases:

sub stream 312 = $x_0[k] = A \cos(\phi_0) + 2Ak\pi\Delta_0 \sin(\phi_0)$;

sub stream 314 = $x_1[k] = -A \sin(\phi_0) + \frac{A(4k+1)\pi\Delta_0}{2}\cos(\phi_0)$;

sub stream 316 = $x_2[k] = -A \cos(\phi_0) - A(2k+1)\pi\Delta_0 \sin(\phi_0)$; and sub stream 318 = $x_3[k] = A \sin(\phi_0) - \frac{A(4k+3)\pi\Delta_0}{2}\cos(\phi_0)$;

for k=0, 1, 2, 3, . . . , N (where $$N = \frac{Na}{4}).$$

Each of the preamble samples $x_0[k]$ (sub-stream 312), $x_1[k]$ (sub-stream 314), $x_2[k]$ (sub-stream 316), and $x_3[k]$ (sub-stream 318) is provided to a respective averaging circuit. In particular, sub-stream 312 is provided to an $x_0$ averaging circuit 322, sub-stream 314 is provided to an $x_1$ averaging circuit 324, sub-stream 316 is provided to an $x_2$ averaging circuit 326, and sub-stream 318 is provided to an $x_3$ averaging circuit 328. $X_0$ averaging circuit 322 operates to average a number of values presented as sub-stream 312 to yield an $x_0$ averaged output 323. The following equation describes $x_0$ averaged output 323:

$$x_0 \text{ averaged output } 323 = \frac{1}{N}\sum_{k=0}^{N-1} x_0[k] = A \cos(\phi_0) + A(N+1)\pi\Delta_0 \sin(\phi_0).$$

$X_1$ averaging circuit 324 operates to average a number of values presented as sub-stream 314 to yield an $x_1$ averaged output 325. The following equation describes $x_1$ averaged output 325:

$x_1$ averaged output 325 =

$$\frac{1}{N}\sum_{k=0}^{N-1} x_1[k] = -A \sin(\phi_0) + \frac{A(2N+3)\pi\Delta_0}{2}\cos(\phi_0).$$

$X_2$ averaging circuit 326 operates to average a number of values presented as sub-stream 316 to yield an $x_2$ averaged output 327. The following equation describes $x_2$ averaged output 327:

$x_2$ averaged output 327 =

$$\frac{1}{N}\sum_{k=0}^{N-1} x_2[k] = -A \cos(\phi_0) - A(N+2)\pi\Delta_0 \sin(\phi_0).$$

$X_3$ averaging circuit 328 operates to average a number of values presented as sub-stream 318 to yield an $x_3$ averaged output 329. The following equation describes $x_3$ averaged output 329:

$x_3$ averaged output 329 =

$$\frac{1}{N}\sum_{k=0}^{N-1} x_3[k] = A \sin(\phi_0) - \frac{A(2N+5)\pi\Delta_0}{2}\cos(\phi_0).$$

Assuming that $0 < |A\Delta_0 \pi N| \ll 1$, the phase offset $\tau_0$ may be estimated by a phase computation circuit 350 using $x_0$ averaged output 323, $x_1$ averaged output 325, $x_2$ averaged output 327, and $x_3$ averaged output 329. Phase computation circuit 350 provides a phase value 355. In particular, the operation of phase computation circuit 350 may be described by the following equation:

$$\text{phase value } 355 = \frac{2}{\pi}\hat{\phi}_0,$$

where $$\hat{\phi}_0 = \tan^{-1}\left(\frac{\hat{x}_3 - \hat{x}_1}{4\hat{x}_0} + \frac{\hat{x}_1 - \hat{x}_3}{4\hat{x}_2}\right),$$

or in a more simplified form $$\hat{\phi}_0 = \tan^{-1}\left(\frac{\hat{x}_3 - \hat{x}_1}{\hat{x}_0 - \hat{x}_2}\right).$$

An estimated gain value 365 is calculated by a gain computation circuit 360 using $x_0$ averaged output 323, $x_1$ averaged output 325, $x_2$ averaged output 327, and $x_3$ averaged output 329. In particular, the operation of gain computation circuit 360 may be described by the following equation:

$$\text{gain value } 365 = \frac{\hat{x}_0 - \hat{x}_2}{4\cos(\hat{\phi}_0)} + \frac{\hat{x}_3 - \hat{x}_1}{4\sin(\hat{\phi}_0)}.$$

An estimated frequency offset is provided from a frequency computation circuit 340 as a frequency value 340. Frequency computation circuit 340 relies on a group of difference sequences 332, 334, 336, 338 provided by a differencing circuit 330. Differencing circuit 330 calculates the series of difference sequences using separate sub-streams 312 ($x_0[k]$), 314 ($x_1[k]$), 316 ($x_2[k]$), and 318 ($x_3[k]$) in accordance with the following equations:

Difference sequence 332 = $d_0[k] = x_0[k+M] - x_0[k] = 2\pi AM\Delta_0 \sin(\phi_0)$;

Difference sequence 334 = $d_1[k] = x_1[k+M] - x_1[k] = 2\pi AM\Delta_0 \cos(\phi_0)$;

Difference sequence 336 = $d_2[k] = x_2[k+M] - x_2[k] = -2\pi AM\Delta_0 \sin(\phi_0)$;

Difference sequence 338 = $d_3[k] = x_3[k+M] - x_3[k] = -2\pi AM\Delta_0 \cos(\phi_0)$;

for k=0, 1, 2, . . . , N−M−1 (where M is a positive integer that is much less than N).

Frequency computation circuit 340 estimates the frequency offset and provides the estimate as frequency value 345 in accordance with the following equation:

Frequency value 345 =

$$\hat{\Delta}_0 = \frac{1}{8\pi\hat{A}M(N-M)} \left[ \begin{array}{c} \frac{1}{\sin(\hat{\phi}_0)} \sum_{k=0}^{N-M-1} (d_0[k] - d_2[k]) + \\ \frac{1}{\cos(\hat{\phi}_0)} \sum_{k=0}^{N-M-1} (d_1[k] - d_3[k]) \end{array} \right].$$

In exemplary embodiments of the present invention, the value of M is selected as either four or five to provide a compromise between the number of averages to minimize the noise effect and the strength of the frequency offset component in the difference signal.

While not shown, sub-streams 312 ($x_0[k]$), 314 ($x_1[k]$), 316 ($x_2[k]$), and 318 ($x_3[k]$) may be processed through a band pass filter centered around the frequency of the user preamble. This will reduce the negative effects of a low signal to noise ratio resulting in an increase in the accuracy of frequency value 345, phase value 355, and gain value 365. In one particular embodiment of the present invention, the band pass filter is implemented as an eleven tap digital finite impulse response filter. Based upon the disclosure provided herein, one of ordinary skill in the art will recognize a variety of filters that may be used in relation to different embodiments of the present invention.

Figure 4:
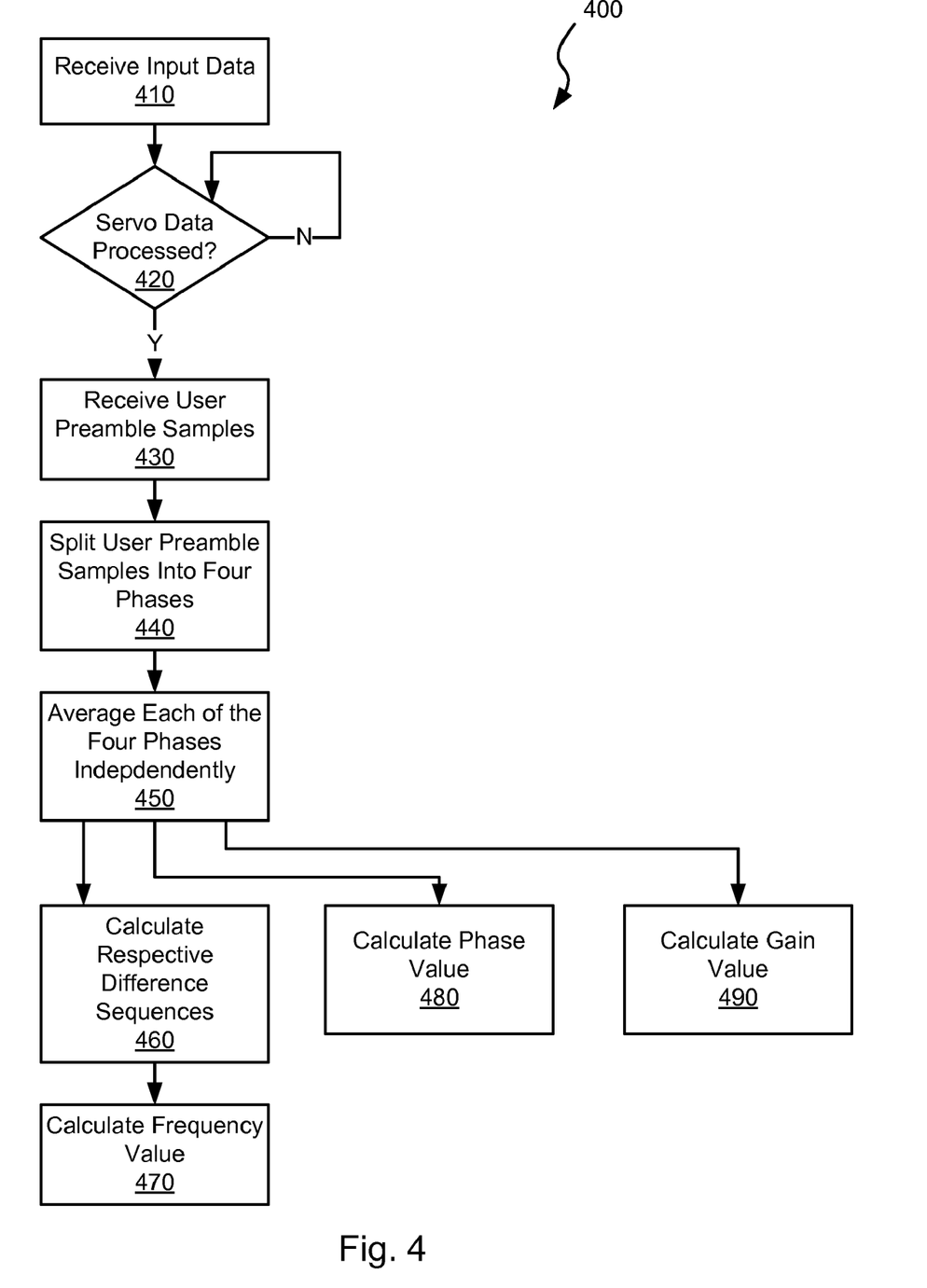
FIG. 4 is a flow diagram showing a method in accordance with various embodiments of the present invention for performing timing and gain acquisition.

Turning to FIG. 4, a flow diagram 400 shows a method in accordance with various embodiments of the present invention for performing timing and gain acquisition. Following flow diagram 400, input data is received (block 410). The input data may be derived from information available from a variety of sources including, but not limited to, a storage medium or a transmission device. The input data may be, but is not limited to, a series of digital samples corresponding to sampling points of an analog input signal. The series of digital samples may be created using an analog to digital converter that receives the analog input signal and provides the corresponding series of digital samples. The series of digital samples include a timing pattern such as, for example, a user preamble or other synchronization information from which phase, frequency and/or gain information about the data included in the series of digital samples may be derived. In one particular embodiment of the present invention, the received input data may be similar to that discussed above in relation to FIG. 1. In this example, the data is derived from a storage medium and includes servo data as is known in the art for identifying a location on a storage medium. This servo data is in addition to user data. Based upon the disclosure provided herein, one of ordinary skill in the art will recognize a variety of sources from which the input data may be derived, and a variety of patterns that the input data may exhibit.

Using processes and circuitry known in the art, the input data is queried to identify the servo data (block 420). Once the servo data is identified (block 420), a user data start flag is asserted indicating the beginning of a user data portion of the input data. The user data portion includes samples of a user preamble that are received at some point after the user data start flag is asserted (block 430). As discussed above, the user preamble may be used to recover timing and/or gain information for processing the user data. In one particular embodiment of the present invention, the user preamble may be a periodic pattern of a defined length. The repeating periodic pattern may include the following four phases {−1, −1, +1, +1}. In some embodiments of the present invention, between twenty and forty repetitions of the above mentioned four phase periodic pattern are included in the user preamble. In other embodiments of the present invention, between ten and sixty repetitions of the above mentioned four phase periodic pattern are included in the user preamble. Each of the four phases of the user preamble is separated into distinct sub-streams, with each of the four phases corresponding to a particular phase of a signal period (block 440). It should be noted that in some embodiments of the present invention that more or fewer than four phases may be used. In the four phase case, the respective phases for each period may be represented by the following equations:

sub stream $A = x_0[k] = A \cos(\phi_0) + 2Ak\pi\Delta_0 \sin(\phi_0)$;

sub stream $B = x_1[k] = -A \sin(\phi_0) + \frac{A(4k+1)\pi\Delta_0}{2} \cos(\phi_0)$;

sub stream $C = x_2[k]d = -A \cos(\phi_0) - A(2k+1)\pi\Delta_0 \sin(\phi_0)$; and sub stream $D = x_3[k] = A \sin(\phi_0) - \frac{A(4k+3)\pi\Delta_0}{2} \cos(\phi_0)$;

for k=0, 1, 2, 3, . . . , N (where $$N = \frac{Na}{4},$$

and Na is the total number of bits in the user preamble).

Values from each of the four sub-streams are incorporated into respective average values (block 450). The respective averages for each of the sub-streams are as set forth in the following equations:

averaged output $A = \frac{1}{N} \sum_{k=0}^{N-1} x_0[k] = A \cos(\phi_0) + A(N+1)\pi\Delta_0 \sin(\phi_0)$;

averaged output $B = \frac{1}{N} \sum_{k=0}^{N-1} x_1[k] = -A \sin(\phi_0) + \frac{A(2N+3)\pi\Delta_0}{2} \cos(\phi_0)$;

averaged output $C = \frac{1}{N} \sum_{k=0}^{N-1} x_2[k] = -A \cos(\phi_0) - A(N+2)\pi\Delta_0 \sin(\phi_0)$;

and averaged output $D = \frac{1}{N} \sum_{k=0}^{N-1} x_3[k] = A \sin(\phi_0) - \frac{A(2N+5)\pi\Delta_0}{2} \cos(\phi_0)$.

Calculating the phase value is done using the aforementioned averaged sub-streams (block 480). Calculating the phase value may be done in accordance with the following equation:

$$\text{phase value} = \frac{2}{\pi} \hat{\phi}_0,$$

where $$\hat{\phi}_0 = \tan^{-1}\left(\frac{\hat{x}_3 - \hat{x}_1}{4\hat{x}_0} + \frac{\hat{x}_1 - \hat{x}3}{4\hat{x}_2}\right),$$

or in a more simplified form $$\hat{\phi}_0 = \tan^{-1}\left(\frac{\hat{x}_3 - \hat{x}_1}{\hat{x}_0 - \hat{x}_2}\right).$$

In addition, calculating a gain value is done using the aforementioned averaged sub-streams (block 490). Calculating the gain value may be done in accordance with the following equation:

$$\text{gain value} = \frac{\hat{x}_0 - \hat{x}_2}{4\cos(\hat{\phi}_0)} + \frac{\hat{x}_3 - \hat{x}_1}{4\sin(\hat{\phi}_0)}.$$

Using the aforementioned averaged values, frequency, phase and gain values are calculated. In particular, respective difference sequences are calculated (block 460). Calculating the difference sequences may be done in accordance with the following equations:

Difference sequence $A = d_0[k] = x_0[k+M] - x_0[k] = 2\pi A M \Delta_0 \sin(\phi_0)$;

Difference sequence $B = d_1[k] = x_1[k+M] - x_1[k] = 2\pi A M \Delta_0 \cos(\phi_0)$;

Difference sequence $C = d_2[k] = x_2[k+M] - x_2[k] = -2\pi A M \Delta_0 \sin(\phi_0)$;

Difference sequence $D = d_3[k] = x_3[k+M] - x_3[k] = -2\pi A M \Delta_0 \cos(\phi_0)$;

for k=0, 1, 2, . . . , N−M−1 (where M is a positive integer that is much less than N). The values from the above mentioned difference sequences are used to calculate an estimated frequency value (block 470). Calculating the estimated frequency value may be done in accordance with the following equation:

Frequency value 345 =

$$\hat{\Delta}_0 = \frac{1}{8\pi \hat{A} M(N-M)} \left[ \frac{1}{\sin(\hat{\phi}_0)} \sum_{k=0}^{N-M-1} (d_0[k] - d_2[k]) + \frac{1}{\cos(\hat{\phi}_0)} \sum_{k=0}^{N-M-1} (d_1[k] - d_3[k]) \right].$$

In exemplary embodiments of the present invention, the value of M is selected as either four or five to provide a compromise between the number of averages to minimize the noise effect and the strength of the frequency offset component in the difference signal.

Figure 5:
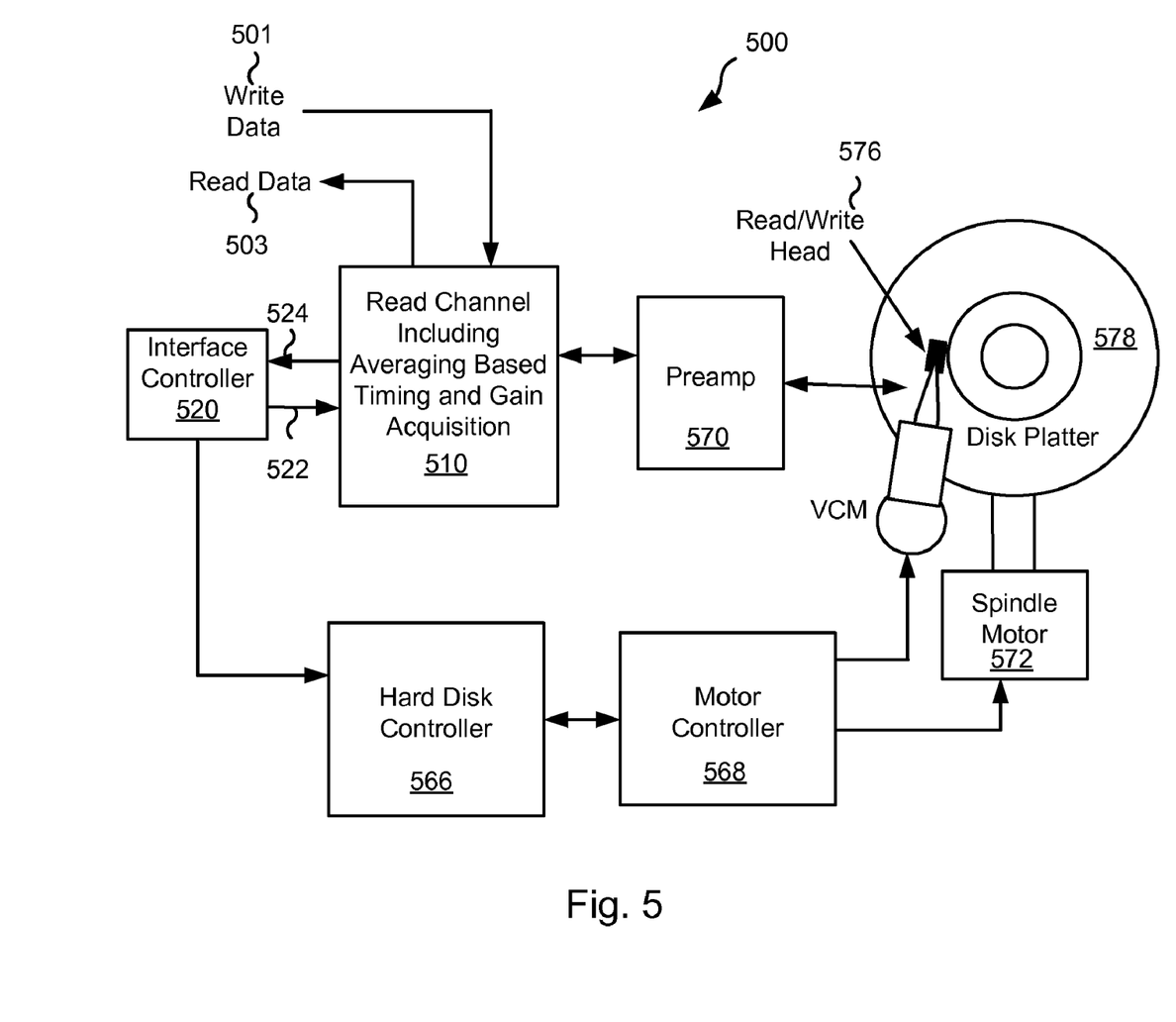
FIG. 5 shows a storage system including a read channel with an averaging based timing and gain acquisition circuit in accordance with one or more embodiments of the present invention.

Turning to FIG. 5, a storage system 500 including a read channel 510 with an averaging based timing and gain acquisition circuit is shown in accordance with various embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and read/write heads 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme. Defect information may be provided to a mapping control module (not shown) that is operable to receive indications of one or more regions of disk platter 578 that are defective, and to map the regions such that they are not used as is known in the art.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 510 via preamplifier 570. Preamplifier 570 is operable to amplify the minute analog signals accessed from disk platter 578. In turn, read channel module 510 decodes and digitizes the received analog signal to recreate the information originally written to disk platter 578. This data is provided as read data 503 to a receiving circuit. A write operation is substantially the opposite of the preceding read operation with write data 501 being provided to read channel module 510. This data is then encoded and written to disk platter 578.

The averaging based timing and gain acquisition circuit may be similar to those discussed above in relation to FIG. 2 and FIG. 3, and/or may operate similar to that discussed above in relation to FIG. 4. Such averaging based timing and gain acquisition circuits are capable of acquiring timing and gain information from data derived from disk platter 578 via preamplifier circuit 570.

In conclusion, the invention provides novel systems, devices, methods and arrangements for acquiring timing and/or gain information. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
    a sample splitting circuit, wherein the sample splitting circuit is operable to receive a data input, wherein the data input includes a series of samples that repeat periodically over at least a first phase and a second phase, and wherein the sample splitting circuit is operable to divide the series of samples into at least a first sub-stream corresponding to the first phase and a second sub-stream corresponding to the second phase;
    a first averaging circuit, wherein the first averaging circuit is operable to average values from the first sub-stream to yield a first average;

a second averaging circuit, wherein the second averaging circuit is operable to average values from the second sub-stream to yield a second average;

a parameter calculation circuit, wherein the parameter calculation circuit is operable to calculate a frequency value based at least in part on the first average and the second average;

a differencing circuit operable to calculate a first differencing sequence based at least in part the first sub-stream and a second differencing sequence based at least in part on the second sub-stream; and wherein the parameter calculation circuit includes a frequency computation circuit, wherein the frequency computation circuit is operable to calculate the frequency value based at least in part on the first differencing sequence and the second differencing sequence.

2. The system of claim 1, wherein the parameter calculation circuit is further operable to calculate a gain value.

3. The system of claim 1, wherein the parameter calculation circuit is further operable to calculate a phase value.

4. The system of claim 1, wherein the series of samples repeats periodically over at least a first phase, a second phase, a third phase and a fourth phase; wherein the sample splitting circuit is operable to divide the series of samples into at least a first sub-stream corresponding to the first phase, a second sub-stream corresponding to the second phase, a third sub-stream corresponding to the third phase, and a fourth sub-stream corresponding to the fourth phase; and wherein the system further comprises:

a third averaging circuit, wherein the third averaging circuit is operable to average values from the third sub-stream to yield a third average;

a fourth averaging circuit, wherein the fourth averaging circuit is operable to average values from the fourth sub-stream to yield a fourth average; and wherein the parameter calculation circuit is operable to calculate the frequency value based at least in part on the first average, the second average, the third average and the fourth average.

5. The system of claim 4, wherein the system further comprises:

a differencing circuit, wherein the differencing circuit is operable to calculate a first differencing sequence based at least in part on the first sub-stream, a second differencing sequence based at least in part on the second sub-stream, a third differencing sequence based at least in part on the third sub-stream, and a fourth differencing sequence based at least in part on the fourth sub-stream; and wherein the parameter calculation circuit includes a frequency computation circuit, wherein the frequency computation circuit is operable to calculate the frequency value based at least in part on the first differencing sequence, the second differencing sequence, the third differencing sequence, and the fourth differencing sequence.

6. The system of claim 4, wherein the parameter calculation circuit is further operable to calculate a gain value, and wherein parameter calculation circuit includes a gain computation circuit, wherein the gain computation circuit is operable to calculate the gain value based at least in part on the first average, the second average, the third average and the fourth average.

7. The system of claim 4, wherein the parameter calculation circuit is further operable to calculate a phase value, and wherein the parameter calculation circuit includes a phase computation circuit, wherein the phase computation circuit is operable to calculate the phase value based at least in part on the first average, the second average, the third average and the fourth average.

8. The system of claim 4, wherein the system further comprises:

a servo data processing circuit, wherein the servo data processing circuit processes a servo data field in the data input.

9. The system of claim 4, wherein the system further comprises:

a user data processing circuit, wherein the user data processing circuit processes a user data filed in the data input using the frequency value.

10. The data processing system of claim 1, wherein the data processing system implemented as part of a storage device.

11. The data processing system of claim 1, wherein the data processing system is a hard disk drive.

12. The data processing system of claim 1, wherein the data processing system implemented as part of a data transfer device.

13. A method for estimating data processing parameters, the method comprising:

receiving a data input at a sample splitting circuit, wherein the data input includes a series of samples that repeat periodically over at least a first phase and a second phase, and wherein the sample splitting circuit is operable to divide the series of samples into at least a first sub-stream corresponding to the first phase and a second sub-stream corresponding to the second phase;

providing the first sub-stream to a first averaging circuit, and averaging the values from the first sub-stream to yield a first average;

providing the second sub-stream to a second averaging circuit, and averaging the values from the second sub-stream to yield a second average;

calculating a frequency value based at least in part on the first average and the second average;

calculating a first differencing sequence based at least in part on the first sub-stream;

calculating a second differencing sequence based at least in part on the second sub-stream; and wherein calculating the frequency value is based at least in part on the first differencing sequence and the second differencing sequence.

14. The method of claim 13, wherein the series of samples repeats periodically over at least a first phase, a second phase, a third phase and a fourth phase; wherein the sample splitting circuit is operable to divide the series of samples into at least a first sub-stream corresponding to the first phase, a second sub-stream corresponding to the second phase, a third sub-stream corresponding to the third phase, and a fourth sub-stream corresponding to the fourth phase; and wherein the method further comprises:

providing the third sub-stream to a third averaging circuit, and averaging the values from the third sub-stream to yield a third average;

providing the fourth sub-stream to a fourth averaging circuit, and averaging the values from the fourth sub-stream to yield a fourth average; and wherein calculating the frequency value is based at least in part on the first average, the second average, the third average and the fourth average.

15. The method of claim 14, wherein the method further comprises:

calculating a first differencing sequence, $d_0[k]$, based at least in part on the first sub-stream, $x_0[k]$, as set forth in the following equation:

$d_0[k]=x_0[k+M]-x_0[k]$;

calculating a first differencing sequence, $d_1[k]$, based at least in part on the first sub-stream, $x_1[k]$, as set forth in the following equation:

$d_1[k]=x_1[k+M]-x_1[k]$;

calculating a first differencing sequence, $d_2[k]$, based at least in part on the first sub-stream, $x_2[k]$, as set forth in the following equation:

$d_2[k]=x_2[k+M]-x_2[k]$;

calculating a first differencing sequence, $d_3[k]$, based at least in part on the first sub-stream, $x_3[k]$, as set forth in the following equation:

$d_3[k]=x_3[k+M]-x_3[k]$; and wherein calculating the frequency value is based at least in part on the first differencing sequence, the second differencing sequence, the third differencing sequence and the fourth differencing sequence in accordance with the following equation:

$$\hat{\Delta}_0 = \frac{1}{8\pi\hat{A}M(N-M)} \left[ \frac{1}{\sin(\hat{\phi}_0)} \sum_{k=0}^{N-M-1}(d_0[k]-d_2[k]) + \frac{1}{\cos(\hat{\phi}_0)} \sum_{k=0}^{N-M-1}(d_1[k]-d_3[k]) \right].$$

16. The method of claim 14, wherein the parameter calculation circuit is further operable to calculate a gain value, and wherein calculating the gain value is done in accordance with the following equation:

$$\left( \frac{\hat{x}_0 - \hat{x}_2}{4\cos(\hat{\phi}_0)} + \frac{\hat{x}_3 - \hat{x}_1}{4\sin(\hat{\phi}_0)} \right),$$

wherein $\hat{x}_0$ represents the first average, $\hat{x}_1$ represents the second average, $\hat{x}_2$ represents the third average, and $\hat{x}_3$ represents the fourth average.

17. The method of claim 14, wherein the parameter calculation circuit is further operable to calculate a phase value, and wherein calculating the phase value is done in accordance with the following equation:

$$\frac{2}{\pi}\hat{\phi}_0,$$

wherein $$\hat{\phi}_0 = \tan^{-1}\left( \frac{\hat{x}_3 - \hat{x}_1}{\hat{x}_0 - \hat{x}_2} \right),$$

$\hat{x}_0$ represents the first average, $\hat{x}_1$ represents the second average, $\hat{x}_2$ represents the third average, and $\hat{x}_3$ represents the fourth average.

18. A storage device, the storage device comprising:

a storage medium, wherein the storage medium includes information, wherein the information includes a periodically repeating pattern that repeats over at least a first phase, a second phase, a third phase and a fourth phase;

a read/write head assembly, wherein the read/write head assembly is disposed in relation to the storage medium;

a read channel circuit, wherein the read channel circuit is operable to receive the information via the read/write head assembly and converts the information to a series of digital samples, and wherein the read channel circuit includes:

a sample splitting circuit, wherein the sample splitting circuit is operable to receive the series of digital samples and is operable to divide the series of digital samples into at least a first sub-stream corresponding to the first phase, a second sub-stream corresponding to the second phase, a third sub-stream corresponding to the third phase, and a fourth sub-stream corresponding to the fourth phase;

a first averaging circuit, wherein the first averaging circuit is operable to average values from the first sub-stream to yield a first average;

a second averaging circuit, wherein the second averaging circuit is operable to average values from the second sub-stream to yield a second average;

a third averaging circuit, wherein the third averaging circuit is operable to average values from the third sub-stream to yield a third average;

a fourth averaging circuit, wherein the fourth averaging circuit is operable to average values from the fourth sub-stream to yield a fourth average;

a parameter calculation circuit, wherein the parameter calculation circuit is operable to calculate a frequency value based at least in part on the first average, the second average, the third average and the fourth average;

a differencing circuit operable to calculate a first differencing sequence based at least in part on the first sub-stream, a second differencing sequence based at least in part on the second sub-stream, a third differencing sequence based at least in part on the third sub-stream, and a fourth differencing sequence based at least in part on the fourth sub-stream; and wherein the parameter calculation circuit includes a frequency computation circuit, wherein the frequency computation circuit is operable to calculate the frequency value based at least in part on the first differencing sequence, the second differencing sequence, the third differencing sequence, and the fourth differencing sequence.

19. The storage device of claim 18, wherein the parameter calculation circuit is further operable to calculate a gain value, wherein the parameter calculation circuit includes a gain computation circuit, and wherein the gain computation circuit is operable to calculate the gain value based at least in part on the first average, the second average, the third average and the fourth average.

20. The storage device of claim 18, wherein the parameter calculation circuit is further operable to calculate a phase value, wherein the parameter calculation circuit includes a phase computation circuit, and wherein the phase computation circuit is operable to calculate the phase value based at least in part on the first average, the second average, the third average and the fourth average.

* * * * *